Feb. 16, 1971 J. W. GRATIAN 3,564,515
INFORMATION HANDLING APPARATUS
Filed Jan. 30, 1964 3 Sheets-Sheet 1

INVENTOR.
JOSEPH W. GRATIAN
BY Martin LuKacher
ATTORNEY

INFORMATION HANDLING APPARATUS

Filed Jan. 30, 1964 3 Sheets-Sheet 2

INVENTOR.
JOSEPH W. GRATIAN
BY Martin LeKacher
ATTORNEY

Feb. 16, 1971 J. W. GRATIAN 3,564,515

INFORMATION HANDLING APPARATUS

Filed Jan. 30, 1964 3 Sheets-Sheet 3

INVENTOR.
JOSEPH W. GRATIAN
BY Martin LuKacher
ATTORNEY

United States Patent Office 3,564,515
Patented Feb. 16, 1971

3,564,515

INFORMATION HANDLING APPARATUS

Joseph W. Gratian, Rochester, N.Y., assignor to General Dynamics Corporation, a corporation of Delaware Filed Jan. 30, 1964, Ser. No. 341,297
The portion of the term of the patent subsequent to Aug. 16, 1987, has been disclaimed
Int. Cl. G11c *11/22*
U.S. Cl. 340—173 7 Claims

ABSTRACT OF THE DISCLOSURE

A memory storage system which uses the interaction of a traveling stress pulse and an electrical field to polarize a ferroelectric material to represent information.

This invention relates to information handling apparatus, and more particularly to a memory for storing digital data.

The invention is especially suitable for use in a random access computer input-output memory system. The invention, however, is generally adaptable for storing data.

Several types of memory devices are known in the art among which are magnetic tape stations, magnetic drum and disk systems, and magnetic core or thin film systems. The mechanical problems of magnetic tape drum and disk systems as well as the cost, size and switching complexity of core and thin film systems make such systems undesirable for several information storage applications.

It is an object of the present invention to provide an improved information storage apparatus which does not have the disadvantages of a moving information storage medium, as in the case of magnetic tape, drum and disk systems, or the structural and switching complexities of core and thin film information storage systems.

It is another object of the present invention to provide an improved solid state information storage device wherein the information may be updated and wherein readout may be nondestructive.

It is still another object of the present invention to provide an improved information storage device wherein a moving information storage media is not needed.

It is still another object of the present invention to provide an improved memory device which can provide a large information storage capacity within a small space.

It is a further object of the present invention to provide an improved solid state memory which requires neither separate connections for each address nor complex switching for random access to selected addresses.

Briefly described, the invention involves a ferroelectric information storage medium, incremental regions of which can be mechanically stressed, as by a mechanical stress pulse which can be acoustically propagated through the medium. The stress pulse alters the hysteresis characteristics of each incremental region of the medium so that the region can be polarized by an electric field of lower intensity than otherwise would be the case. A polarizing field applied in coincidence with the stress pulse through an incremental region produces a polarization of the medium in that region which is representative of the data to be stored.

The invention itself, both as to its organization and method of operation, as well as the foregoing and other objects and advantages thereof, will become more readily apparent from a reading of the following description in connection with the accompanying drawings in which:

FIG. 1 is a schematic representation of memory apparatus embodying the present invention, the representation including block diagrams of the circuitry of the apparatus;

FIG. 2(*a*) and FIG. 2(*b*) are curves illustrating the hysteresis characteristics of the ferroelectric material utilized in the apparatus shown in FIG. 1;

FIG. 5(*a*) is a block diagram of a read-write logic circuit which may be used, together with others in the system shown in FIG. 5.

Figure 1:
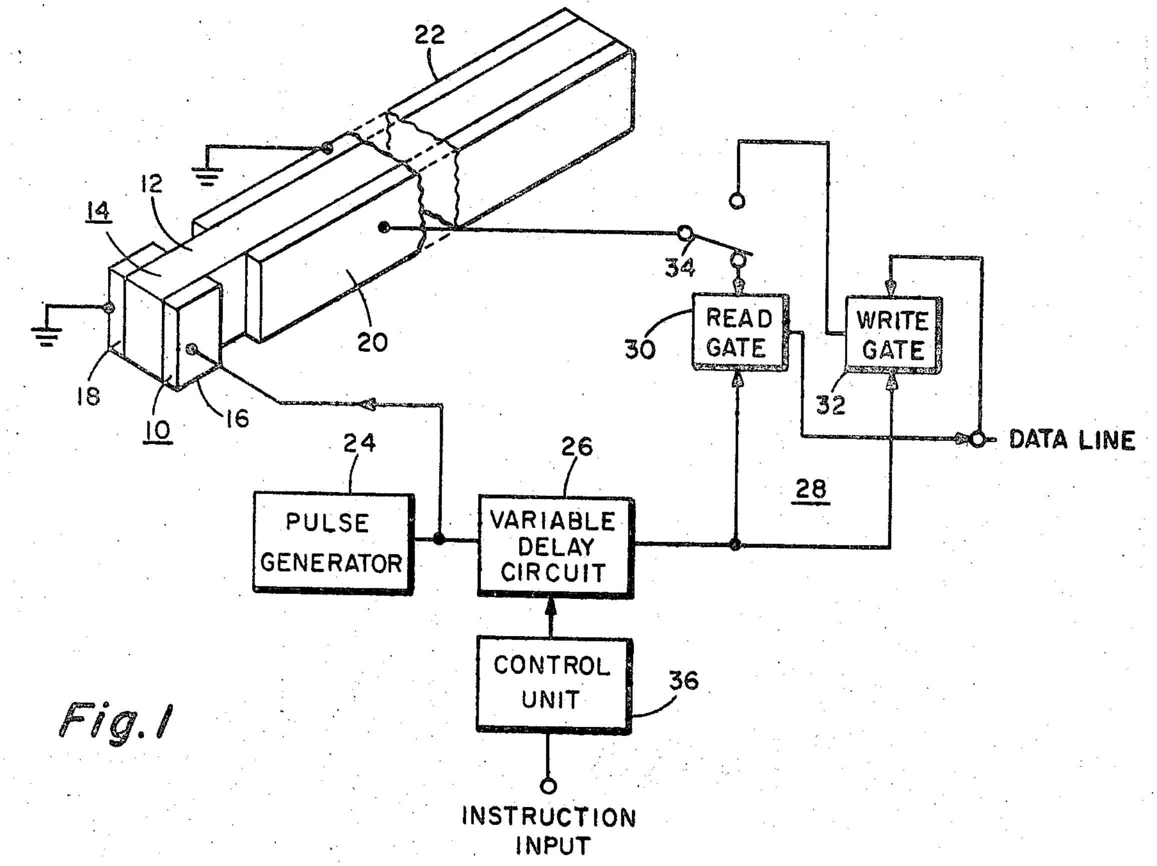

Referring more particularly to FIG. 1, there is shown a memory device 10 including an elongated rectangular rod 12 of ferroelectric material. By ferroelectric material is meant material which exhibits a hysteresis loop effect and also a sensitivity to stress by a change in its polarization characteristics. Members of this class of ferroelectric material are barium titanate, lead zirconate titanate, lead titanate, and triglycine sulfate. In a preferred embodiment of the invention the rod 12 may be of barium titanate ferroelectric material.

A transducer 14 is provided at one end of the rod 12. This transducer is defined by a pair of conductive electrodes 16 and 18 and the portion of the end of the rod 12 which is sandwiched therebetween. The transducer 14 is an electromechanical transducer, since it may be excited or actuated by an electrical signal to piezoelectrically develop a mechanical pulse which then can propagate longitudinally along the rod 12. An acoustic termination, for example slabs of vibration absorbing material, such as felt, may be located adjacent to the end faces of the rod 12 for absorbing and preventing the reflection of the propagated mechanical pulses. These acoustic terminations are not shown in FIG. 1 to simplify the illustration. The mechanical pulses may also be thought of as a sonic wave which propagates along an acoustic or sonic transmission line provided by the rod 12.

Another pair of conductive electrodes 20 and 22 are arranged on opposite side faces of the rod 12 for establishing an electric field across the entire length of the rod 12, except for a region around the electromechanical transducer 14. The conductive electrodes 20 and 22 provide access to information which may be stored in successive increments along that portion of the rod 12 which is sandwiched therebetween. Only a single connection to one of the electrodes 20 provides access to all of the addresses for the data for which storage is provided in the rod 12. The other electrodes may be grounded. Accordingly, the memory device 10 is entirely solid state.

The circuitry associated with the device 10 may include a pulse generator 24 which provides pulses at intervals which may be slightly greater than the time required (propagation time) for a mechanical pulse to travel the length of the rod 12. The output pulses from the generator 24 excite the electromechanical transducer 14 and a mechanical pulse is propagated along the rod 12 for each output pulse which is generated. The pulses are applied to a variable delay circuit 26, which may be of various types known in the art, such as a phantastron or a monostable multivibrator which provides an output pulse, the leading or lagging edge of which may be shifted in time.

The output pulse from the generator 24, after a delay in the circuit 26, is applied to the read-write logic 28 which includes a read gate 30 and a wire gate 32. The logic 28 also includes a switch 34 which connects one of the conductive electrodes 20 to an input of the read gate 30 or to an output of the write gate 32. The read and write gates may be AND gates.

A control unit 36, operated by the instruction portion of the data, is connected to the variable delay circuit 26 for adjusting delay provided by the circuit in correspondence with an address for the data in the device 10. For example, the control unit 36 may be a digital to analog converter which converts the instruction code representing the address to a voltage which varies the delay in the delay circuit 26. This delay may correspond to the time of propagation of the mechanical pulse to a point on the rod corresponding to the address of the data. The read gate 30 or the write gate 32 are then enabled so that the data line may be connected to the conductive electrode 20. When the switch 34 is in the read position, the data line is connected to the conductive electrode 20 in coincidence with the arrival of the mechanical pulse at the address for the data to be read out of the device.

Similarly, the data line is connected through the write gate to the conductive electrode 20 so that the signals representing the data may be stored at the proper address in the rod 12. It should be understood that by address is meant that increment along the rod 12 which provides storage for a particular item of data. This data may be a binary "1" bit or a binary "0" bit which respectively may be represented by opposite senses of polarization of the increment or by the absence and presence of polarization of the increment.

In an alternative mode of operatiton, a train of mechanical pulses may be propagated along the rod 12 during the propagation time for the rod 12. The absence and presence of a mechanical pulse at different locations in the pulse train can respectively represent data bits of opposite value. A voltage pulse applied to the electrode 20 coincident with the termination of the mechanical pulse train will effect the polarization of successive increments along the rod in accordance with the data represented by the pulse train. The data bits stored in the rod may be read out sequentially at the electrode 20, when a single mechanical pulse is again propagated along the rod 12.

Figures 2A, 2B:
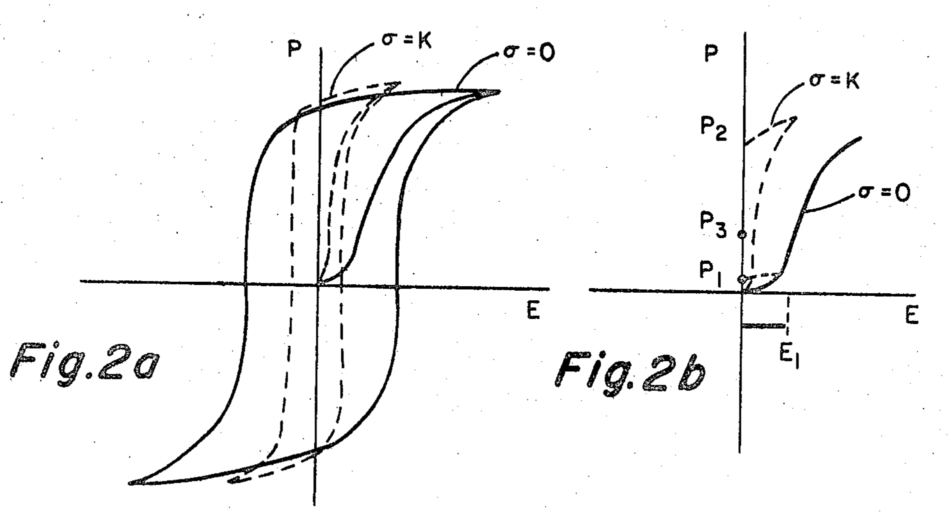

The mode of operation of the material in providing storage for data in response to coincidence of stress and electrical pulses and for the readout of such stored data is graphically depicted in FIG. 2*a* and FIG. 2*b*. The following description should not be taken to indicate adherence to any theory or mode of operation. Referring to FIG. 2*a*, the solid line curve illustrates the polarization characteristics of an increment of ferroelectric material constituting the rod 12 when no stress is applied ($\alpha=0$). On the other hand when the increment of ferroelectric material is under stress, its polarization characteristics is indicated by the dash line curve. Accordingly, the field necessary to permanently polarize the increment of ferroelectric material in the absence of stress ($\alpha=0$) is much larger than the field necessary to permanently polarize the material in the presence of stress ($\alpha=k$).

Referring to FIG. 2*b*, when the output of the delay circuit 26 and the data line are connected through the write gate to the conductive electrode 20, a field having an intensity indicated on FIG. 2*b* as $E_1$ is established, across the rod 12 between the electrodes 20 and 22. Assuming a signal representing a binary data bit is present on the data line, only that increment of the rod 12 at the address for that data bit dictated by the instruction is under stress coincident with the establishment of the field $E_1$ across the rod 12. The field $E_1$ is then sufficient to drive the increment at the address beyond the knee of the polarization curve. However, the field is insufficient to substantially polarize the remainder of the rod 12. The polarization of the increments at the address resulting from the coincident application of the stress and field $E_1$ is indicated on the curve of FIG. 2*b* at $P_2$. The remainder of the material is negligibly polarized as indicated at $P_1$. When the field and stress pulses are removed from the increment at the address, a residual polarization $P_3$ remains at the address to represent the storage of the binary "1" bit which appeared on the data line. The residual polarization of the remainder of the rod is relatively negligible.

When a stress pulse is subsequently applied to the increment at the address, the polarization increases from $P_3$ towards $P_2$. The read gate is enabled by the output of the variable delay circuit when the instruction to read out the signal at the address is applied to the control unit 36. A signal corresponding to the change in polarization is then transmitted through the read gate to the data line and represents the stored bit. A capacitor for coupling a signal representing the change in voltage corresponding to the change in polarization may be used to block the transmission of all signals except those corresponding to the change in polarization. This readout is nondestructive, since no polarization voltages are applied to the electrodes 20 and 22 during readout.

The memory may be erased by applying alternating voltages between the electrodes 20 and 22. The memory may be updated by selectively erasing any address. A voltage opposite in polarity and equally or somewhat larger in magnitude to the voltage applied to the electrodes for the storage of information may be used for erasure. After selective erasure the memory may be updated, if desired, with new data.

The foregoing principles of operation are also applicable when it is desired to provide storage for bits of opposite value by opposite senses of polarization of successive increments of the rod 12. Then, the entire rod may be pre-polarized, in one sense, say negatively, and selected increments may be polarized positively by the ismultaneous application of stress and field thereto to store a bit of one value, bits of opposite value being stored in negatively polarized rod increments.

Figure 3:
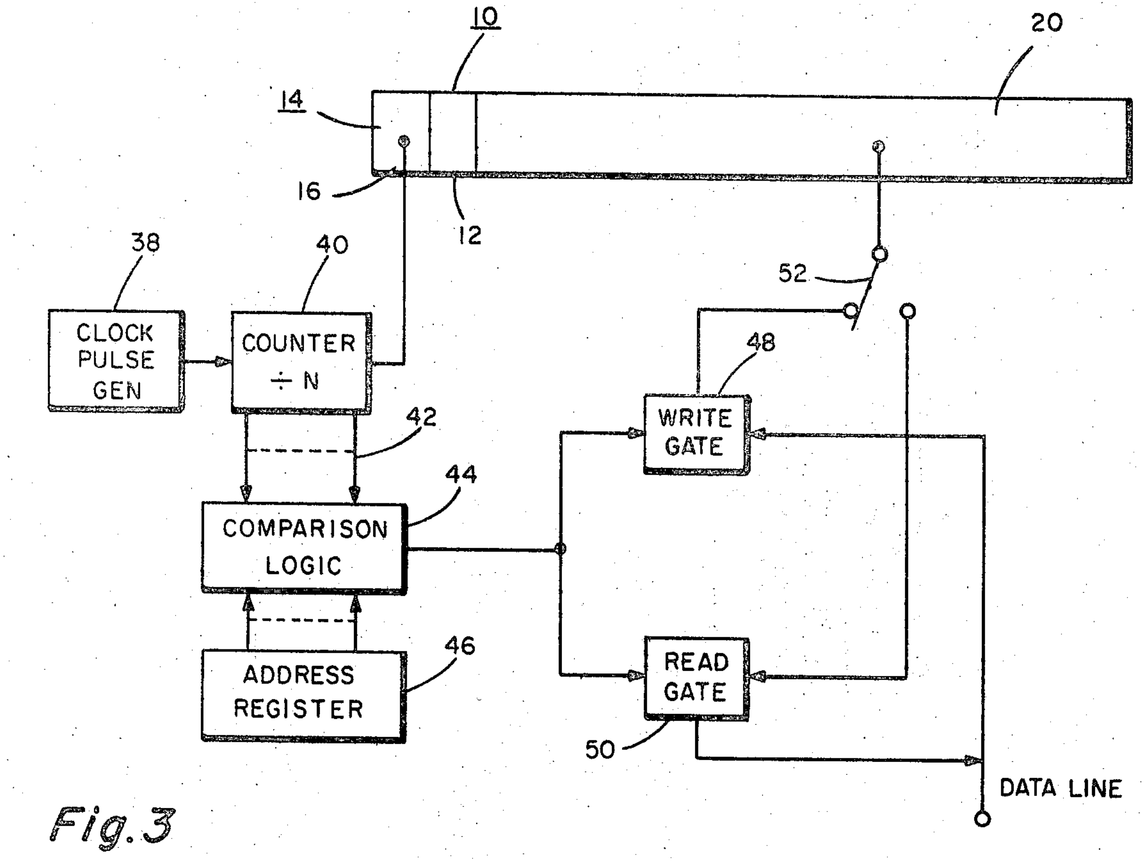
FIG. 3 is a block diagram of circuitry for providing random access to information storage addresses in the apparatus of FIG. 1.

Another system for the memory device 10 is illustrated in FIG. 3. A clock pulse generator 38 provides output pulses which are counted in a counter 40. The counter 40 provides one output pulse for a predetermined number, N, of input clock pulses. The counter 40 therefore divides by N. There are this predetermined number, N, of addresses in the storage device 10. The output of the counter operates the piezoelectric transducer 14. After the counter has counted N clock pulses, the transducer 14 is actuated and a mechanical pulse is propagated through the rod 12 of the device N. The number of clock pulses next counted by the counter 40 before a second count of N is reached is therefore representative of the address in the device 10 at which the propagated mechanical pulse has arrived. This count is indicated by a digital number represented by the levels on a plurality of output lines 42 of the counter 40. These output lines 42 are connected to a comparison logic network 44 which may comprise AND gates.

A register 46 stores a number representing the address in the device 10 to which access is desired. The write and read gates 48 and 50 are enabled when the count in the counter 40 and the address in the register 46 are the same. The write gate can be connected to the conductor electrode 20 by means of the switch 52. Then, a write signal corresponding to the data on the data line is applied to the electrodes and a polarizing field coincident with the stress pulse is applied at the selected address corresponding to the address stored in the register 46.

For readout, the switch 52 connects the electrode 20 to an input of the read gate 50 and a signal corresponding to the change in polarization produced by the stress pulse at the address in the device 10, corresponding to the wanted address stored in the register 46, is gated through the enabled read gate 50 to the data line.

Figure 4:
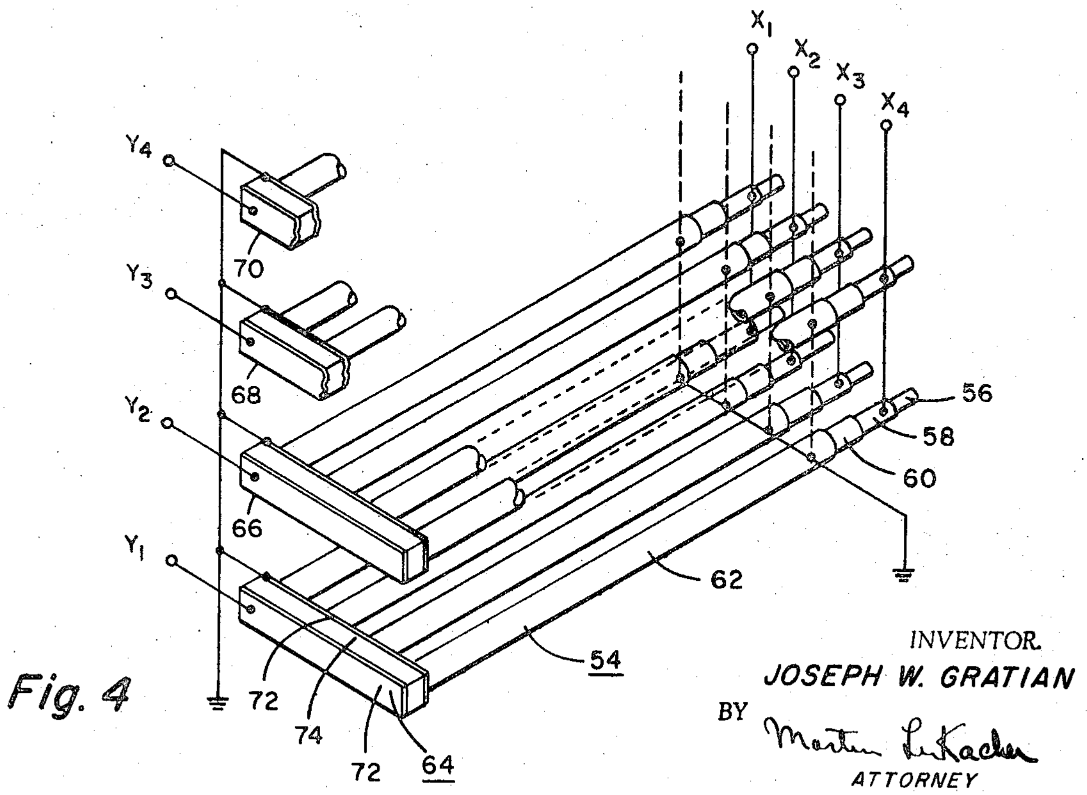
FIG. 4 is a diagrammatic, perspective view of a matrix array memory embodying the invention.

Referring to FIG. 4, there is shown a matrix array of ferro-electric storage devices 54 in accordance with another embodiment of the present invention. The devices 54 are arranged is rows and columns respectively along $x$ and $y$, orthogonal coordinates. The devices 54 are similar to each other and each includes a core in the form of a cylindrical rod 56 of low-loss dielectric material which is vibratile and can support the propagation of a mechanical pulse such as quartz. The cylindrical rod may be a quartz filament of approximately a few mils diameter. Over this rod 56, is deposited a sheath or layer of conductive material such as silver which provides an electrode 58 of the device 54. A connection may be made to this electrode 58. A thin film 60 of ferroelectric material may be deposited over the electrode 58. Another sheath or layer of conductive material may be deposited over the film 60 of ferroelectric material and provides an electrode 62 to which connections may be made to ground or some other point of reference potential. Separate electromechanical transducers 64, 66, 68 and 70 are respectively provided for each row of memory devices 64. These transducers may include conductive electrodes 72 which sandwich layers of piezoelectric material 74.

When the transducer for a particular row, say transducer 64, is actuated by an electrical pulse, mechanical pulses are propagated axially along rod 56 and therefore also along the ferroelectric thin film 60 of all the devices 54 in that row. Each of the columns of devices 54 have their ungrounded electrodes 58 interconnected to separate terminals indicated as $x_1$, $x_2$, $x_3$ and $x_4$. One electrode 72 of each of the transducers 66, 68 and 70 may be connected to the point of reference or ground potential. The other electrodes of the transducers 64, 66, 68 and 70 are respectively connected to terminals $y_1$, $y_2$, $y_3$, and $y_4$. Each of the devices 54 has storage for a predetermined number of bits of data, say N data bits.

Figures 5, 5A, 6:
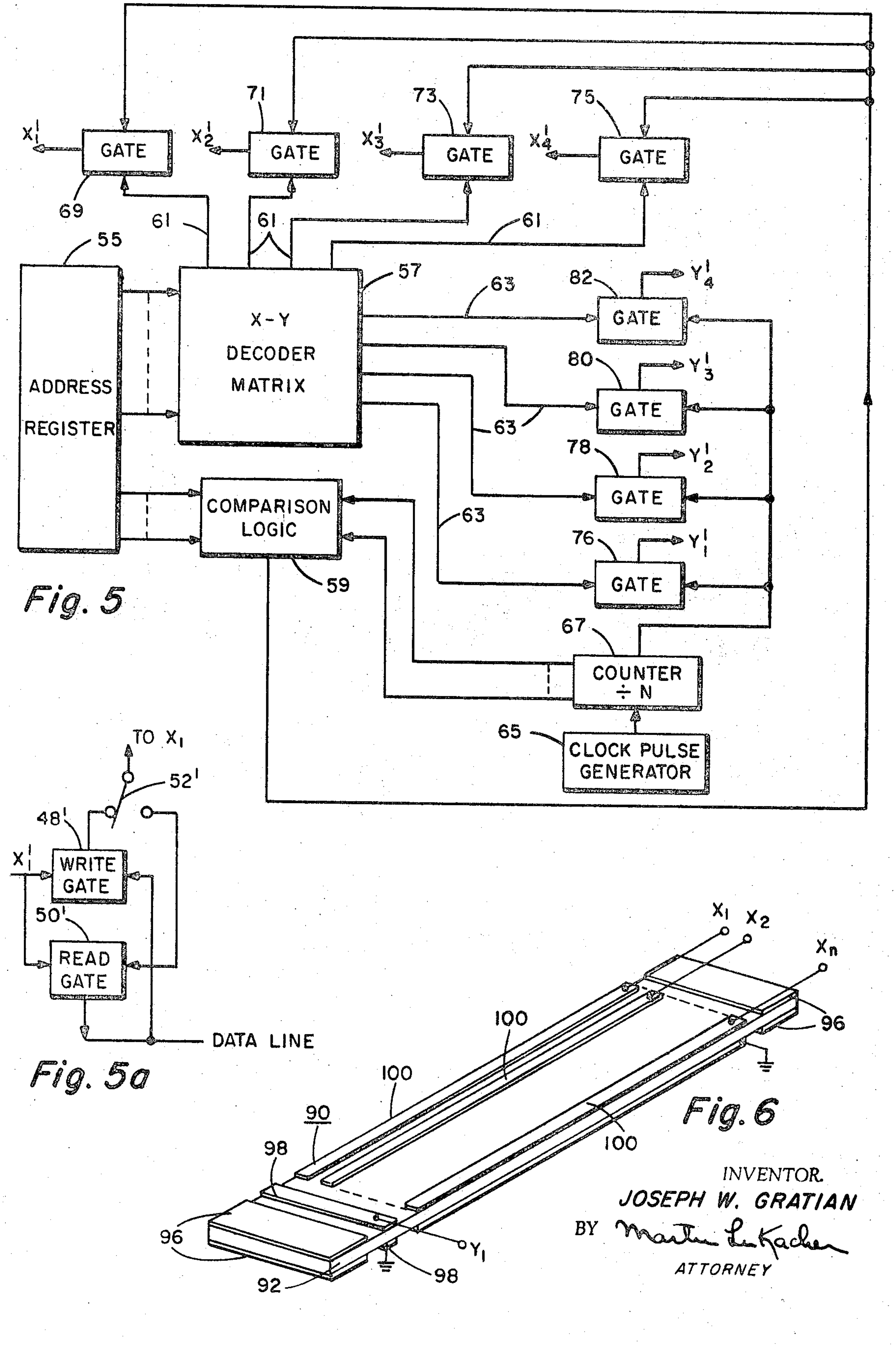
FIG. 5 is a block diagram of a system for addressing the memory shown in FIG. 4.
FIG. 6 is a diagrammatic, perspective view of a memory plane embodying the invention.

A system, shown in FIG. 5, is provided for granting access to any address, at random, in the matrix array at which these data bits may be or are stored for reading out the stored data bits or writing data bits at these addresses. The desired address is stored in an address register 55 which has several outputs. Some of these outputs are connected to inputs of an $x$–$y$ decoder matrix 57, while others are connected to a comparison logic network 59, similar to the comparison logic network 44 (FIG. 3). The matrix 57 has four $x$ coordinate output lines 61 and four $y$ coordinate output lines 63.

A clock pulse generator 65, similar to the generator 38, applies output pulses to a counter 67 which divides by N similarly with the counter 40 (FIG. 3). After the counter 67 is in operation, the number stored in the counter is compared in the comparison logic network 59 with the portion of the address stored in the register 55, and an output is transmitted to each of a plurality of gates 69, 71, 73 and 75. These gates receive inputs from the $x$ output lines of the decoder matrix 57. Only that gate which is enabled by a signal from the decoder matrix 57 is enabled to provide an output to the read-wire logic (see FIG. 5*a*) of the system. The output of the gates 69, 71, 73 and 75 are respectively indicated as $x_1'$, $x_2'$, $x_3'$ and $x_4'$.

FIG. 5*a* illustrates the read-write logic which is connected to the $x_1'$ output of the gate 68. This logic is similar to the read-write logic shown in FIG. 3 and includes the gates 48', 50' and the switch 52'. The operation of this read-write logic is similar to the operation of the read-write logic of FIG. 3. The logic connects the data line and the output of the enabled one of the gates 69, 71, 73 and 75, to the selected one of the output terminals $x_1$, $x_2$, $x_3$ and $x_4$ (see FIG. 4) which are connected to the columns of storage devices 54.

The output pulse of the counter 67 is transmitted through whichever one of a plurality of gates 76, 78, 80 and 82 is enabled by the $y$ outputs 63 of the decoder matrix 57. The outputs of these gates $y_1'$, $y_2'$, $y_3'$ and $y_4'$ are connected respectively to the input terminals $y_1$, $y_2$, $y_3$ and $y_4$ of the transducers 65, 67, 69 and 71 (see FIG. 4).

Accordingly, when the gates 75 and 76 are enabled by the decoder matrix 56 in response to the number stored in address register 55, a pulse from the counter 67 is transmitted through the gate 76, its output $y_1'$, and the input terminal $y_1$ to activate the transducer 64. Mechanical pulses are then propagated axially along each of the devices 54 in the lower row of devices in the matrix (see FIG. 4). Acoustic termination may be provided to prevent reflections of these pulses back from the opposite ends of these devices 54. When the count registered in the counter 67 corresponds to a portion of the number registered in the address register, an output from the comparison logic network 54 is transmitted through the enabled gate 75, its output $x_4'$, and the terminal $x_4$ of the righthand column of devices 54, shown in FIG. 4. The data line is then connected either through the read gate 48' or the write gate 50' to the conductor 58 of the lower righthand corner device 54 in the array (FIG. 4) at the same instant as the arrival of the mechanical pulse at the selected address location in that device 54. Data may then be written into the device at the address, or data stored at the address, may be read from the device into the data line.

A planar ferroelectric storage element is illustrated in FIG. 6. It will be appreciated that a plurality of such elements may be stacked one on top of the other to provide a high capacity memory. Random access to a particular address in any one of the planar elements may be provided by means of a system such as shown in FIGS. 5 and 5(*a*).

The planar element 90 shown in FIG. 6 includes a plate 92 of ferroelectric material. Acoustic terminations in the form of slabs of acoustic absorbing material 96 may be provided at opposite ends of the plate. A pair of transducer electrodes 98 are connected between the side edges of the plate 92 and transversely to a plurality of pairs 100 (only 3 of which are shown in FIG. 6) of conductive electrodes. The transducer electrodes 98 and the portion of the ferroelectric plate sandwiched therebetween define an electromechanical transducer for generating mechanical pulses which propagate along the plate for stressing incremental areas thereof. One of these transducer electrodes 98 may be grounded and the other connected to a terminal indicated as $y_1$, similar to terminal $y_1$ of the transducer 64 shown in FIG. 4. One of each of the pairs of electrodes 100 is connected to a point of reference potential while the others are respectively connected to terminals $x_1, x_2 \ldots x_n$, analogous to the terminals $x_1, x_2, x_3 \ldots$ shown in FIG. 4. The terminal $x_1, x_2 \ldots x_n$, may be connected to corresponding output terminals of gates, such as the gates 69, 71, 73 and 75 in a system for granting random access to any address in the memory plane. The transducer electrodes 98 and electrode pairs 100 may be deposited by vapor deposition techniques. When the planes are stacked one over the other to form a matrix memory, a sheet of insulating material may be inserted therebetween for acoustic and/or electrical isolation purposes. When vapor deposition techniques are referred to herein it should be understood that vapor deposition techniques known in the semiconductor device art may be used.

A larger amount of storage per planar array may be provided by constructing the plate 92 in the form of a rectangular core of vibratile material, such as a metallic conductive material, which may be connected to ground, the core is covered on its opposite side faces with layers or thin films of ferroelectric material. Strip electrodes, such as the electrodes 100, are deposited and arranged in a manner shown in FIG. 6 over the thin films of ferroelectric materials on the opposite side faces of the covered core. A separate electromechanical transducer may be mechanically coupled to one end face of the core for propagating mechanical pulses longitudinally through the core and the ferroelectric thin films thereon.

From the foregoing description it will be apparent that there has been provided improved memory apparatus which has few of the disadvantages of known memory systems such as magnetic tape, disk or drum memories or magnetic core or plane systems. The memory apparatus embodying the invention may be very compact and relatively low in cost per bit of information which can be stored therein. While several embodiments of memory apparatus have been shown, it will be appreciated that many variations and modifications within the spirit of the invention, may become apparent to those skilled in the art. Accordingly, it is desired that the foregoing be considered merely as illustrative and not in any limiting sense.

What is claimed is:

1. Memory apparatus comprising
(a) a body of ferroelectric material capable of being permanently polarized in the presence of an electric field larger than a certain intensity,
(b) electrodes adjacent said body for establishing an electric field therein when energized,
(c) means for mechanically stressing different increments of said body and reducing the electric field intensity required for permanently polarizing said increments,
(d) circuits connected to said electrodes for applying electrical signals to said electrodes corresponding to data for establishing an electric field of intensity sufficient to permanently polarize only those of said increments under stress, the polarization of said increments representing such data, and
(e) circuits responsive to changes in the voltage between said electrodes when different ones of said increments are undergoing changes in stress for providing output signals representing data stored in said increments.

2. Memory apparatus comprising
(a) a sonic wave propagating medium including ferroelectric material,
(b) electrodes extending along said medium,
(c) an actuator for exciting the propagation of the sonic wave along said medium, and
(d) means for applying data representing signals to said electrodes coincidentally with the arrival of said wave at different increments along said medium for writing said data permanently in said medium.

3. Memory apparatus comprising
(a) a sonic wave propagating medium including ferroelectric material,
(b) means coupled to said medium for exciting the propagation of a sonic wave along said medium,
(c) means including electrodes extending from said exciting means longitudinally along substantially the entire length of said medium over which said wave propagates for polarizing successive increments of said medium as said wave propagates therealong whereby to represent data at said increments by the polarization thereof, and
(d) means responsive to changes in voltage output at said electrodes when said sonic wave arrives at different ones of said increments in said medium for reading out said data stored in said medium.

4. Memory apparatus comprising
(a) a rod of ferroelectric material,
(b) an electromechanical transducer at one end of said rod for generating a mechanical pulse which propagates along said rod when said transducer is actuated,
(c) electrodes adjacent said rod and disposed longitudinally therealong from said one end substantially to the opposite end of said rod,
(d) a pulse generator coupled to said transducer for actuating said transducer,
(e) a data line, and
(f) control means responsive to the output of said pulse generator for connecting said data line to said electrodes at different intervals of time corresponding to the arrival of said mechanical pulses at different successive increments spaced from each other longitudinally along said line.

5. The invention according to claim 4 wherein said control means includes a variable delay circuit coupled to said generator for transmitting said pulse after a selected time interval, and a control unit for varying the delay time interval of said delay circuit.

6. Memory apparatus comprising
(a) a plurality of first separate electrodes each defining a plurality of groups of longitudinally extending regions, each of said groups of said regions disposed in separate first planes along a first of three rectangular coordinates,
(b) ferroelectric material disposed in said first planes in each of said regions between said electrodes which define said regions,
(c) different ones of the electrodes which are disposed in different ones of said first planes also being disposed in separate second planes along a second of said coordinates,
(d) a plurality of different connections, each common to a different group of said electrodes which are arranged in each of said second planes,
(e) a plurality of electromechanical transducers separately mechanically coupled to the ferroelectric material in separate ones of said first planes, said transducers all being arranged in a third plane along a third of said coordinates, and
(f) read-write means coupled to said transducers and to each of said common connections for selectively writing data in and reading data out of said ferroelectric material in said regions by polarizing successive increments of said material located at different positions along said three rectangular coordinates.

7. The invention as set forth in claim 6 wherein said electrodes and ferroelectric material in each of said regions define a separate rod lying in said first planes and extending along said second planes.

References Cited

UNITED STATES PATENTS

| | | | |
|---|---|---|---|
| 2,845,611 | 7/1958 | Williams | 340—173 |
| 3,016,524 | 1/1962 | Edmunds | 340—173MS |
| 3,069,664 | 12/1962 | Adams | 340—173 |
| 3,132,257 | 5/1964 | Yando | 333—30 |

FOREIGN PATENTS

| | | |
|---|---|---|
| 873,367 | 7/1961 | Great Britain. |

TERRELL W. FEARS, Primary Examiner

U.S. Cl. X.R.

179—30; 333—30; 340—173.2, 174